United States Patent
Cho

(10) Patent No.: US 10,984,676 B2
(45) Date of Patent: Apr. 20, 2021

(54) METHOD AND SYSTEM FOR FACILITATING LEARNING OF CORRESPONDENCE BETWEEN ONE OR MORE LETTERS AND ONE OR MORE SPEECH CHARACTERISTICS

(71) Applicant: Yoonsung Cho, Pasadena, CA (US)

(72) Inventor: Yoonsung Cho, Pasadena, CA (US)

( * ) Notice: Subject to any disclaimer, the term of this patent is extended or adjusted under 35 U.S.C. 154(b) by 27 days.

(21) Appl. No.: 16/246,312

(22) Filed: Jan. 11, 2019

(65) Prior Publication Data

US 2019/0147764 A1    May 16, 2019

Related U.S. Application Data

(63) Continuation-in-part of application No. 15/296,789, filed on Oct. 18, 2016, now Pat. No. 10,276,059.

(51) Int. Cl.
*G09B 19/04* (2006.01)
*G09B 5/02* (2006.01)

(52) U.S. Cl.
CPC ............... *G09B 19/04* (2013.01); *G09B 5/02* (2013.01)

(58) Field of Classification Search
CPC .................................. G09B 5/02; G09B 19/04
See application file for complete search history.

(56) References Cited

U.S. PATENT DOCUMENTS

| | | | | |
|---|---|---|---|---|
| 4,030,211 A | * | 6/1977 | McGinley | G09B 19/04 434/167 |
| 4,713,008 A | * | 12/1987 | Stocker | G09B 17/00 283/46 |
| 5,429,513 A | * | 7/1995 | Diaz-Plaza | G09B 1/00 273/302 |
| 5,953,692 A | * | 9/1999 | Siegel | G09B 5/065 704/1 |
| 6,077,080 A | * | 6/2000 | Rai | G09B 1/00 434/159 |
| 6,126,447 A | * | 10/2000 | Engelbrite | G09B 19/06 434/167 |
| 10,276,059 B2 | * | 4/2019 | Cho | G09B 17/003 |
| 2004/0115598 A1 | * | 6/2004 | Goodfriend | G09B 17/00 434/159 |
| 2006/0040242 A1 | * | 2/2006 | Mejia | G09B 1/00 434/170 |
| 2006/0088805 A1 | * | 4/2006 | Pitkethly | G09B 1/02 434/167 |

(Continued)

*Primary Examiner* — Steve Rowland

(57) ABSTRACT

A method of facilitating learning of correspondence between one or more letters and one or more speech characteristics, is disclosed. The method may include receiving, using a processing device, at least one letter indicator corresponding to at least one letter. Further, the method may include analyzing, using the processing device, the at least one letter indicator. Further, the method may include identifying, using the processing device, at least one orientation indicator corresponding to the at least one letter indicator based on the analyzing. Further, the method may include displaying, using a display device, the at least one letter with the at least one orientation in relation to a reference axis based on the at least one orientation indicator. Further, the displaying of the at least one letter may be representative of at least one speech characteristic associated with the at least one letter.

18 Claims, 23 Drawing Sheets

(56) References Cited

U.S. PATENT DOCUMENTS

| | | | | |
|---|---|---|---|---|
| 2012/0164611 A1* | 6/2012 | O | ............................ | G09B 19/06 |
| | | | | 434/167 |
| 2013/0143184 A1* | 6/2013 | Neikrug | .................. | G09B 19/00 |
| | | | | 434/169 |
| 2019/0147764 A1* | 5/2019 | Cho | ........................ | G09B 19/04 |
| | | | | 434/169 |

* cited by examiner

The bivalence test can be used for phonemes in onset or rime position.
Example
Teacher says 'Spell the word "how"'
Student sees this on the board
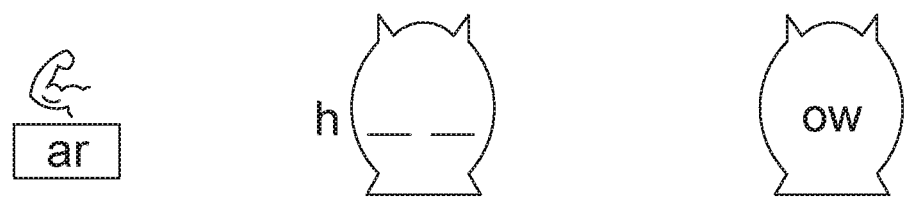
Student sees this on the board and teacher says "clap" We can place the block color initially to have them discriminate more easily.
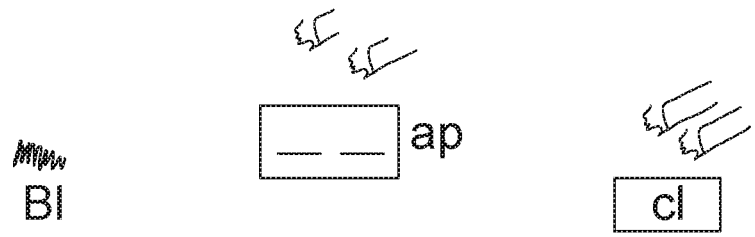
FIG. 9

In fact, this system intentionally uses "misspelling" in order to properly and logically teach students how to read. Therefore, the word "earth" in this system will look like this on the sound spelling card.

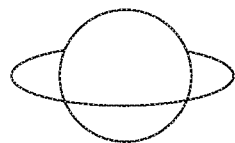
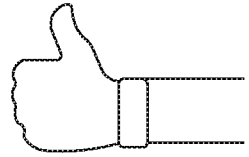

The letter "a" is stated so that students can see it in an "unconscious" way similar to arrows in the right turn lanes. While students see that the letter "a" exists in the word "earth" it does not play any roll like the "h" in the word "school" since phonetically, "school" is better spelled "scool" or "skool". Therefore, this system does NOT ignore or negate the standard spelling system. It simply gives students a way to recognize its existence while it does not play a specific role in pronunciation.

Some other points...

1. The letters "l", "m" and "n" are the most difficult to pronounce for beginning readers because they have two separate sounds in the onset and rime position.

"L" sound in the most position -> "lu" as in "laugh", "love" and etc.
"L" sound in the rime position -> "ul" as is "handle", "tunnel", "table" and etc.

FIG. 10

Notice that the subject and the modifier are in opposite position.

Example for a question

English -> "May I have some food?"

Japanese "Watashiwa tabenomo a yushite ite mo yoidesu?"
(I food may some have?)

Therefore, to teach student to write, we form the template for them to think and arrange words in sequences that are basic in English which subject, verb modifier and predicate.

Note: The word banks are under the word itself to provide spelling. Initially, we give students pictures like the orthography lessons but this will be less necessary after students are proficient in spelling.

Sentence template example

I have a black cat.

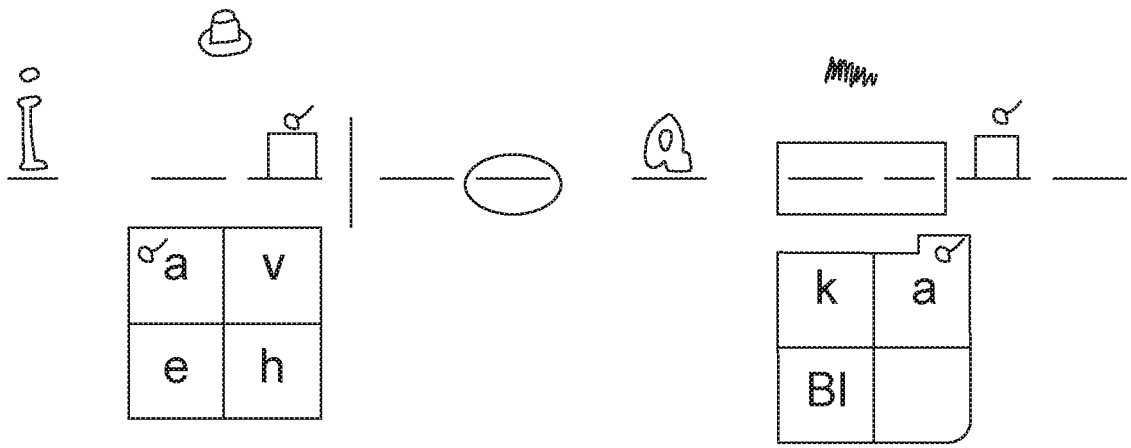

FIG. 11

Anthropomorphic letters for short "a"
Anthropomorphic letters are in between pictures and the standard letters and the shape of the sound in integrated in the letters themselves. These are particularly useful for students who are having transitioning from CV combinations with pictures on top to no pictures in standard books.

Decodable Books

Sa|m ha|s a fa|t ca|t.     5

Pa|m ha|s a Bl|a|k ca|t.     10

The Bl|a|k ca|t ra|n to the     16 ma|t. The fa|t ca|t ha|s     21 two ja|m|s. The fa|t ca|t     26 ha|s a na|p. The Bl|a|k ca|t     32 ra|n Ba|k to the va|n.     37

FIG. 13

If a student is proficient in one short vowel sound as short "a" but has difficulties transferring from short CV "a" and "I" then need to use what is known as anthropomorphic letters. These letters have the shape of the sound imbedded in the letters. What is difficult for slower readers is processing the changes in consonants as well as the vowels that follow them and blending them afterwards. For instance, when you go from "Ba" to "hi" the student is actually doing two things at the same time and that may prove difficult for some students. In that case use the following letters.

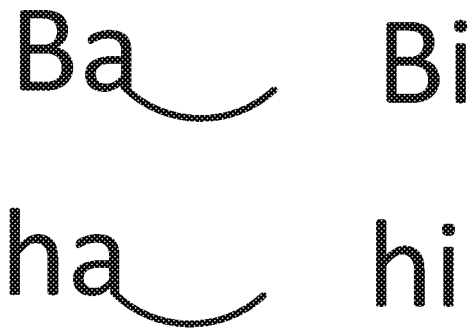

Note: This is extremely critical. When teaching students these letters, focus on the length of the tail in the letter "a" and purposely read it slow as you glide your finger on the tail. On the short "I" purposely read it really fast as point to the little dot on the top of the letter "I" CV words so that they can use more energy on the consonant of the onset position. Give them explicit direction that "a" is elongated so they can focus on the tail on the "a" while "I" is short with the dot on the "I". It is very helpful to model this with your finger by reading the "Ba" with the long "a" tail by saying "Baaaaaaa" (for 4 to 5 seconds)while

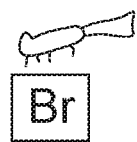
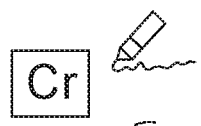
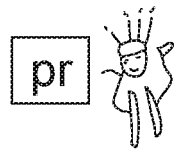
FIG. 16

Lesson 3

In lesson 3, the student is focusing on blending the onset CV part with me consonant on the rime position. Remember that this lesson is accessed only after the student has mastered the CV chart of all short "a" vowels which means reading them with no picture aid and no sound by sound assistance.

This chart is an example of a CV combination with the rime consonant. As a teacher, you have two options. You can use the entire list of consonants in the alphabet. Or you can simply use real word CV C blending.

Hint: to make this list easier, you can do one of two things or both.
a. Place picture cues for CV
b. Use the colored consonants in the rime position.
c. When doing this lesson, it is critical to draw a line as the student reads so that we don't get two distinct sounds such as "ca...boo" for the word "cab"
d. Have students KEEP reading "baaaaaaa" until they get to the final letter. De-emphasize speed in this lesson.
e. For the first month or so, it is completely acceptable to have picture cues next to the rime in the consonant position to reinforce the word that they are reading.
f. Sometimes, it is encouraged to place pictures to the right of the rime letter. For instance, put a picture of a bag and badge next to "bag" and "baj" because initially, the rime blending can be difficult.

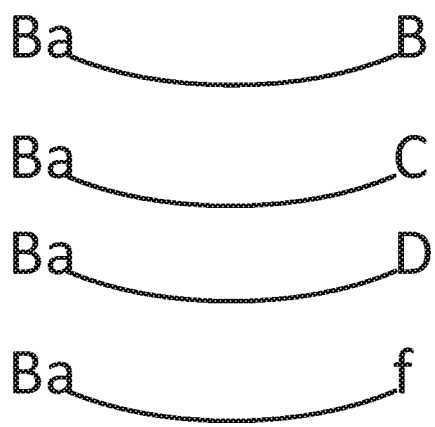

FIG. 17 m 2002 m 2004 (rotated)

sam 2006 (with rotated m)

FIG. 20

METHOD AND SYSTEM FOR FACILITATING LEARNING OF CORRESPONDENCE BETWEEN ONE OR MORE LETTERS AND ONE OR MORE SPEECH CHARACTERISTICS

The current application is a continuation-in-part (CIP) application of a U.S. non-provisional application Ser. No. 15/296,789 filed on Oct. 18, 2016.

FIELD OF THE INVENTION

Generally, the disclosure relates to the field of data processing. More specifically, the disclosure relates to methods and systems for facilitating learning of correspondence between one or more letters and one or more speech characteristics.

BACKGROUND OF THE INVENTION

Imparting knowledge about reading and writing a language to a child requires elementary teaching methodologies which aim to deal with learning about distinct sound pattern associated with each letter. A pre-school child falling under the age group of three to five years cannot read written text until he/she learns that how to pronounce each letter in a word. Hence, a method of phonics is used to help learn the language while using phonetics (sounds) of each letter or word that is formed. The word phonics is the preferred method for imparting knowledge about the sounds of letters and letter groups to beginners so they can proficiently read, spell and pronounce new words. Taking the case of the English language, there are pre-defined rules which determine the sounds of the letters and the letter groups.

In the current English phonics method, 44 English phonemes are preferably used to represent distinct sound patterns that can be applied to form distinguished words having distinct sound patterns. For example, the English words "hot" and "hat" are distinguished by the phoneme /o/ and the phoneme /a/ along with /h/ and /t/. However, it has been observed that in an earlier stage of the English language learning process, a learner may find difficulty to grasp 44 phonemes and their respective meanings because of irregularities in spelling of a word and its respective sounds. For example, father should phonetically be spelled "fahther". To impart better learning techniques, there may be a need of the phonics system to minimize the number of phonemes to an appropriate number and use age appropriate pictures on top of the letters (in particular, the first two letters of the consonant-vowel-consonant words like "hat"). Further, in the current English phonics method, the preference is given to a correct spelling of the word while teaching the sound pattern of the word. This sometimes creates confusing outcomes and the level of understanding may become open-ended. For example, the English word "word" may be used in the current phonics method to describe an r-controlled "ur" sound which may be slightly confusing to the learner since it can be spelled phonetically spelled as either "werd", "wird" or "wurd".

Further, a letter or groups of letters in a given context logically should not have more than one sound where as in English, the letter or the same group of letters can have multitude of sounds and there is no particular rationale why it should be that way. Further, existing systems and methods to facilitate learning of correspondence between one or more letters and one or more speech characteristics in one or more contexts is complex and requires a complete knowledge of phonetics of one or more letters in a word. Hence, there is a need for the system and method facilitating learning of correspondence between one or more letters and one or more speech characteristics.

SUMMARY OF THE INVENTION

According to some embodiments, a method of facilitating learning of correspondence between one or more letters and one or more speech characteristics is disclosed. The method may include receiving, using a processing device, at least one letter indicator corresponding to at least one letter.

Further, the method may include analyzing, using the processing device, the at least one letter indicator. In some embodiments, the at least one letter indicator may include a cluster indicator representing a plurality of predetermined letters.

Further, the method may include identifying, using the processing device, at least one orientation indicator corresponding to the at least one letter indicator based on the analyzing. Further, the at least one orientation indicator may represent at least one orientation with which the at least one letter may be displayed.

Further, the method 1800 may include displaying, using a display device, the at least one letter with the at least one orientation in relation to a reference axis based on the at least one orientation indicator. Further, the displaying of the at least one letter may be representative of at least one speech characteristic associated with the at least one letter.

Further, a system of facilitating learning of correspondence between one or more letters and one or more speech characteristics is disclosed. Further, the system may include a processing device configured for receiving at least one letter indicator corresponding to at least one letter. Further, the processing device may be configured for analyzing the at least one letter indicator. Further, the processing device may be configured for identifying at least one orientation indicator corresponding to the at least one letter indicator based on the analyzing. Further, the at least one orientation indicator may represent at least one orientation with which the at least one letter may be displayed. Further, the system may include a display device configured for displaying the at least one letter with the at least one orientation in relation to a reference axis based on the at least one orientation indicator. Further, the displaying of the at least one letter may be representative of at least one speech characteristic associated with the at least one letter.

BRIEF DESCRIPTION OF THE DRAWINGS

FIG. 9 is a photograph depicting a bivalence spelling test.

FIG. 10 is a photograph depicting a phonetic spelling method.

FIG. 11 is a photograph depicting a sentence template.

FIG. 13 is a photograph depicting a sample decodable book with pictures and syllable breaks.

FIG. 14 is a photograph depicting discrimination letters for short "a" vs. short "i".

FIG. 15 is a photograph depicting a sample of a high frequency word chart.

FIG. 16 is a photograph depicting a consonant blend chart.

FIG. 17 is a photograph depicting a consonant-vowel to consonant blending chart.

FIG. 20 shows an articulatory gesture indicator indicating movement of a speech articulator muscle.

DETAILED DESCRIPTION OF THE INVENTION

Figure 1:
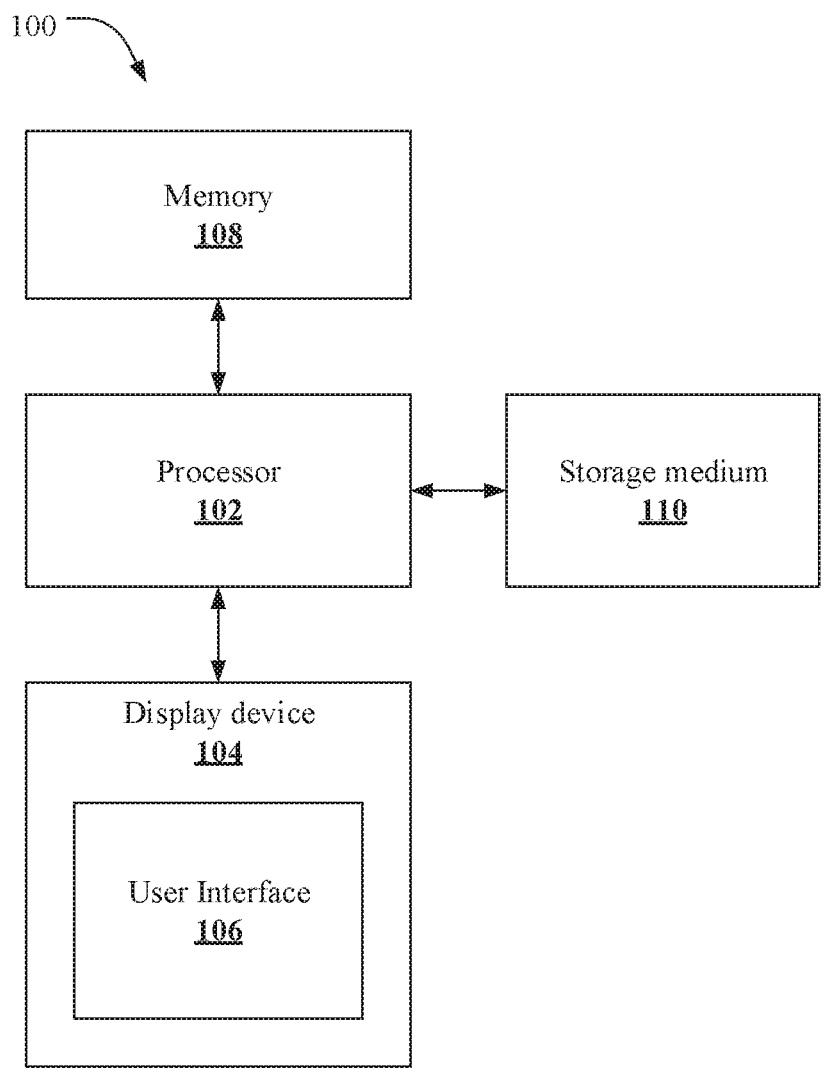
FIG. 1 illustrates a block diagram of a system for facilitating learning of correspondence between speech sounds and spelling patterns, in accordance with some embodiments.

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary.

Overview

According to some embodiments, a method of facilitating learning of correspondence between spelling patterns and speech sounds is disclosed. The method may include generating, using a processor, a first plurality of sound-letter cards corresponding to a first set of phonemes. Additionally, each phoneme in the first set may be represented by a single letter of the English alphabet. Further, each sound-letter card may include a speech sound and a spelling pattern. Furthermore, the generating may be based on one or more of a first criterion and a second criterion. Further, according to the first criterion, the spelling pattern corresponding to a speech sound of a letter may include letters corresponding to a phoneme associated with the letter followed by schwa sound. Furthermore, according to the second criterion, the spelling pattern of a speech sound may include a plurality of letters corresponding to a phoneme associated with the speech sound. Additionally, the plurality of letters may be located at an onset position in the spelling pattern. The method may further include displaying, using a display device, one or more of the first plurality of sound-letter cards based on a predetermined lesson plan.

In some embodiments, the method may further include generating, using the processor, a second plurality of sound-letter cards corresponding to a second set of phonemes. Additionally, each phoneme of the second set of phonemes may be one or more of a digraph, a trigraph and an r-controlled vowel. Additionally, each sound-letter card of the second plurality of sound-letter cards may include each of a speech sound and a spelling pattern. Accordingly, the method may further include displaying, using the display device, one or more of the second plurality of sound-letter cards based on the predetermined lesson plan.

In some embodiments, the displaying may include de-emphasizing a visual characteristic of at least one redundant letter in the spelling pattern. Additionally, the at least one redundant letter has no role in pronunciation of the spelling pattern.

In some embodiments, the visual characteristic may include a font size.

In some embodiments, the method may further include generating, using a processor, a third plurality of sound-letter cards. Additionally, each sound-letter card of the third plurality of sound-letter cards may include a word and a spelling pattern. In some embodiments, the word may include a short vowel. Additionally, the word conforms to a consonant-vowel-consonant (CVC) form. Additionally, the spelling pattern may include a plurality of letters representing a blending of speech sounds associated with consonant-vowel (CV) part of the CVC form; and displaying, using the display device, one or more of the third plurality of sound-letter cards based on the predetermined lesson plan.

In some embodiments, the third plurality of sound-letter cards may include a first set of sound-letter cards, a second set of sound-letter cards and a third set of sound-letter cards. Additionally, each word in the first set of sound-letter cards may include a short "a". Additionally, each word in the second set of sound-letter cards may include a short "i". Additionally, each word in the third set of sound-letter cards may include one or more of a long vowel and an r-controlled vowel. Additionally, the displaying may include displaying the first set of sound-letter cards, the second set of sound-letter cards and the third set of sound-letter cards in a time order. Additionally, displaying of the first set of sound-letter cards precedes displaying of each of the second set of sound-letter cards and the third set of sound-letter cards.

In some embodiments, the displaying of a plurality of sound-letter cards from a selected set of sound-letter cards may be performed randomly. Additionally, the selected set of sound letter cards may be one or more of the first set of sound-letter cards, the second set of sound-letter cards and the third set of sound-letter cards.

In some embodiments, the displaying may include displaying one or more of the speech sound and the spelling pattern based on a control input received from one or more of a learner interface and a teacher interface.

In some embodiments, the method may further include displaying a spelling template including a plurality of symbols selected from the group consisting of a space, a slash, a square and an arrow. Additionally, a symbol of the plurality of symbols visually indicates a separation between two syllables.

In some embodiments, the method may further include displaying, using the display device, at least one picture associated with at least one spelling pattern of the one or more of the first plurality of sound-letter cards. Additionally, the at least one picture facilitates pronunciation of the at least one spelling pattern.

In some embodiments, the spelling pattern may include a misspelling of a corresponding word.

In some embodiments, the spelling pattern may include a plurality of misspellings of the corresponding word.

In some embodiments, displaying the third plurality of sound-letter cards may include alternately displaying words with different consonants but a common short vowel.

In some embodiments, the generating may be based further on a third criterion. Additionally, according to the third criterion the spelling pattern corresponds to a high frequency word.

In some embodiments, the method may further include displaying each of a correct phoneme and an incorrect phoneme. Additionally, the spelling template may include at least one blank space. Additionally, the method further may include receiving a phoneme selection input from a learner interface corresponding to one of the correct phoneme and the incorrect phoneme to complete the at least one blank space.

In some embodiments, the spelling pattern may include visually offset groups of letters associated with syllables of a corresponding word in order to show the separation of syllables within the word.

The present disclosure will be further illustrated with examples as follows. FIG. 1 illustrates a block diagram depicting a learning system 100 to facilitate learning of correspondence between spelling patterns and speech sounds. The learning system 100 may include a processor 102, a display device 104, a user interface 106, a memory 108, and a storage medium 110. The processor 102 may be for example, but not limited to, AMD Sempron, Intel Celeron, AMD Athlon 64, Pentium 4, Dual-core, AMD Athlon 64 X2, Intel Pentium D, Intel i3, Intel i5, Intel i7, AMD A6, AMD A8, and AMD A10. The processor 102 may be in communication with the display device 104 through a hardware circuitry to display one or more sound-letter cards generated by the learning system 100. Accordingly, the display device 104 may include, for example, but not limited to, an LED display, LCD display, plasma display and so on.

In accordance with an embodiment, the processor 102 may be configured to execute an array of instructions that may be stored in the memory 108. The memory 108 may be a random access memory (RAM) which may fall under various categories such as, but not limited to, DRAM, SRAM, and DRDRAM. Further, the memory 108 may be configured to store temporary data upon the processing of instructions by the processor 102. The instructions executable by the processor 102 may be fetched from the storage medium 110. Accordingly, the storage medium 110 may be configured to store instructions that, when executed by the processor 102, causes the processor 102 to generate the one or more sound-letter cards, in accordance with various embodiments.

Figure 2:
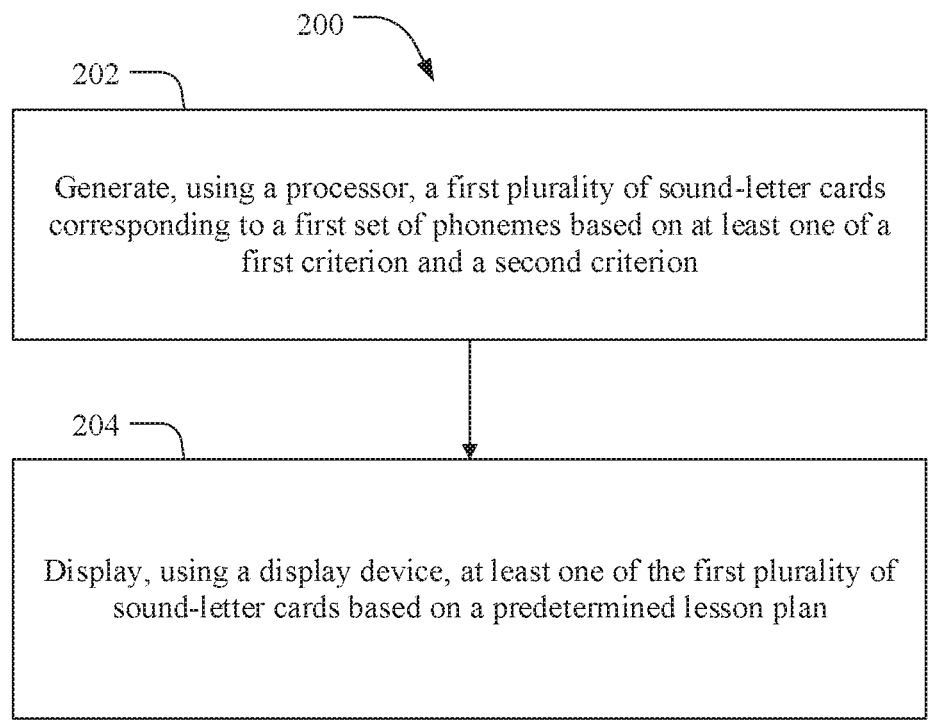
FIG. 2 illustrates a flowchart depicting a method 200 of facilitating learning of correspondence between speech sounds and spelling patterns, in accordance with some embodiments.

Referring to FIG. 2, illustrated therein is a flowchart 200 depicting a method performable by the learning system 100, in accordance with an embodiment. In some instances, the learning system 100 may be configured to display one or more sound-letter cards on the display device 104 based on an input provided to the user interface 106. The user interface 106 may include one or more of a teacher interface and a learner interface. Accordingly, in some embodiments, the display device 104 may be configured to present one or more of the teacher interface and the learner interface. For example, a teacher may operate a computer comprising the display device 104 while one or more learners may operate, for example, a tablet computer comprising the display device 104.

The one or more sound-letter cards may include each of a speech sound and a spelling pattern associated with the speech sound. The speech sound may include one or more sets of discrete sounds corresponding to the spelling pattern. Further, the spelling pattern may include one or more of letters corresponding to a phoneme associated with the speech sound. A phoneme is the smallest and unique unit in the sound system of a language.

Accordingly, the method 200 may include a step 202 of generating, using the processor 102, a first plurality of sound-letter cards corresponding to a first set of phonemes. Each phoneme in the first set of phonemes may be represented by a single letter of the English alphabet. Further, each sound-letter card may include a speech sound and a spelling pattern.

In an instance, the first plurality of sound-letter cards may correspond to the 25 phonemes corresponding to single letters of the English alphabet. Accordingly, in some embodiment, the learning system 100 may be configured to initially facilitate learning of these 25 phonemes which may exclude, for example, difficult phonemes such as the "qu" phoneme. The "Qu" phoneme may be treated similarly as a digraphs or r-controlled vowels. Consequently, the learning system 100 provides improvement over a traditional learning system by initially focusing on facilitating learning of these 25 phonemes starting from "a" through "z".

In some embodiments of the present disclosure, the step 202 of generating the first plurality of sound-letter cards may be based on a first criterion and a second criterion. According to the first criterion, the spelling pattern corresponding to a speech sound of a letter includes letters corresponding to a phoneme associated with the letter followed by schwa sound. For example, each word in the first plurality of sound-letter cards may include the schwa sound or the short "u" sound. This is because the short "u" sound is the most natural sound a person makes without altering lips, tongue or jaw. While traditional learning systems may use the word "ball" to refer to the sound of the letter "b, the learning system 100 generates the word "bus" wherein the letter "b" is followed by the short "u" sound.

Further, according to the second criterion, the spelling pattern of a speech sound includes a plurality of letters corresponding to a phoneme associated with the speech sound. Additionally, the plurality of letters may be located at an onset position in the spelling pattern. Accordingly, the learning system 100 improves over the traditional learning systems because it focuses on the onset position of the sound. For instance, the traditional learning systems may have used the word "bird" to refer to the r-controlled "ir" sound. However, this may confuse a learner because beginners may focus on the letter "b" in the word "bird" instead of the "ir" sound. Therefore, the learning system 100 uses "earth" to refer to the "er" phoneme. Although "earth" is spelled with "ear" instead of "er", because "ear" in "earth" is pronounced as "erth", the learning system 100 generates the word "earth".

Additionally, in some embodiments, the generating may be based further on a third criterion. According to the third criterion, the spelling pattern may correspond to a high-frequency word that occurs frequently (i.e. statistically) in spoken and/or written language.

Further, the method 200 may include a step 204 of displaying, using the display device 104, one or more sound-letter cards of the first plurality of sound-letter cards based on a predetermined lesson plan. For example, the teacher may create the lesson plan by specifying the first plurality of sound-letter cards for learning the 25 phonemes associated with the letters "a" through "z". Additionally, the predetermined lesson plan may include a sequence in which sound-letter cards of the first plurality of sound-letter cards are displayed on the display device 104. For example, in some embodiments, the predetermined lesson plan may order the sound-letter cards based on corresponding frequency of occurrence in spoken and/or written usage. Accordingly, in some instances, sound-letter cards corresponding to high-frequency phonemes may be displayed first, followed by sound-letter cards corresponding to low-frequency phonemes. Further, in some embodiments, the learning system 100 may be configured to enable the teacher to specify an arbitrary order of displaying the first plurality of sound-letter cards based on pedagogical considerations. Further, in some embodiments, one or more of the learner interface and the teacher interface may be configured to receive a control input that may control displaying of the first plurality of sound-letter cards. For example, the control input may cause display of only the speech sound without the spelling pattern. Subsequently, after a controlled delay, the spelling pattern corresponding to the speech sound may be displayed.

Figure 5:
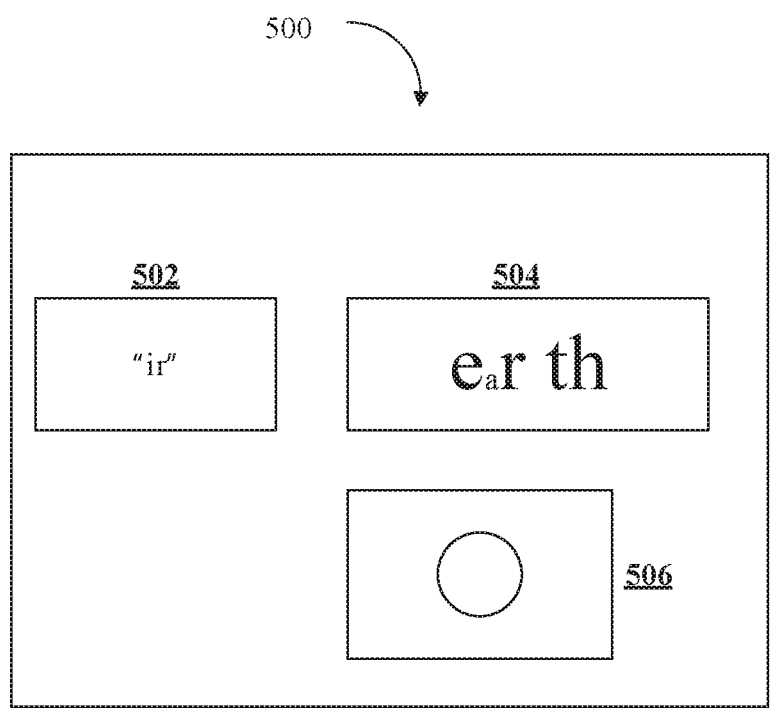
FIG. 5 illustrates a user interface displaying an exemplary sound-letter card according to some embodiments.

Furthermore, in some embodiments, the displaying of the one or more sound-letter cards may be performed by de-emphasizing a visual characteristic of one or more redundant letters in the spelling pattern. The visual characteristic may include, for example, a size, a color, a transparency level etc. Additionally, in some instances, the learning system 100 may be configured to advantageously employ "misspelling" in order to properly and logically teach learners how to read. For instance, the spelling pattern 504 "earth" corresponding to the speech sound 502 "ir" may be displayed on the display device 104 as shown in an exemplary sound-letter card 500 in FIG. 5. As illustrated, the letter "a" is de-emphasized as it has no role in the pronunciation of the spelling pattern. In other words, the spelling pattern may include a misspelled version of a word, such as "earth" in order to facilitate learning. Additionally, in some instances, a plurality of misspellings of a word may be used, such as for example, mu /nny, mo /nny and mo /ney in order to represent speech sound of "money". Accordingly, in some embodiments, the spelling pattern may include visually offset groups of letters associated with syllables of a corresponding word in order to show the separation of syllables within the word.

Further, in such cases, the one or more redundant letters, such as the letter "a", may be displayed so that the learner can perceive the one or more redundant letters in an "unconscious" way. Accordingly, learners can see that, for example, the letter "a" exists in the word "earth" but it does not play any role like the letter "h" in the word "school" since phonetically, "school" may be better spelled as "scool" or "skool". Therefore, in some embodiments, the learning system 100 may not ignore or negate the standard spelling system. It may give learners a way to recognize existence of such letters which do not play a role in pronunciation in the spelling pattern.

Further, in some embodiments of the present disclosure, the learning system 100 may be configured to consider the following points with regard to the onset position of the plurality of letters corresponding to the phoneme associated with the speech sound.

The letters "l", "m" and "n" are the most difficult to pronounce for beginning readers because they have two separate sounds in the onset and rime position.

| | |
|---|---|
| "L" sound in the onset position | -> "lu" as in "laugh", "left", "love" etc. |
| "L" sound in the rime position | -> "ul" as is "handle", "tunnel", "table" etc. |
| "M" sound in the onset position | -> "mother", "make", "messy" etc. |
| "M" sound in the rime position | -> "plum", "slam", "cream" etc. |
| "N" sound in the onset position | -> "nothing", "never", "nice" etc. |
| "N" sound in the rime position | -> "clean", "plan", "ton" etc. |

In all the onset sounds of "l", "m" and "n", the mouth is opened after reading it. In all the rime sounds of "l", "m" and "n", the mouth is closed. The onset sound is far more critical to teach in the beginning stages of reading these letters because in terms of audible comprehension, the onset sounds of "l", "m" and "n" are critical but the rime sounds of "l", "m" and "n" are not nearly as significant.

For example, consider the situational context where a child is looking to drink something from the refrigerator. The child may say the following to the mother:

1. "Mom, is there any soda in a can?"
2. "Mom, is there any soda in a cam?"

Notice that if the mother listens to the statement #2, she may replace "cam" with "can".

In another example, the child may alter the onset sound of the letter "n" versus replacing the letter "n" in the rime position. All things being equal while placing the letter "n" in the beginning or the end, which one is easier to comprehend? This is a simple proof to illustrate that IF we had to PROVE teaching ONLY two letters to a reading student, it is ALWAYS more advantages to teach the first two letters of a 3 letter word rather than the back two letters.

1. "Where is my mon?"
2. "Where is my nom?"

Notice that sentence #2 is very difficult to comprehend.

The following are some tests to demonstrate comparative importance between the onset position and rime position.

Test 1—Pick one of the following choices that sound closer to the word "mom":

a. Mon;
b. Nom.

Test 2—Pick one of the following choices that sound closer to the word "mom":

a. Mo_ (maw_);
b. b. _om (_awm).

The experience of the present inventor indicates that, in the above tests, the choice (a) is more likely to be picked. Therefore, in some embodiments, the learning system 100 prefers the onset position rather than the rime position.

Additionally, in some embodiments, the method 200 may further include displaying, using the display device, at least one picture associated with at least one spelling pattern of the at least one of the first plurality of sound-letter cards. Further, the at least one picture may be such that it facilitates pronunciation of the at least one spelling pattern. For example, in displaying a sound-letter card corresponding to the phoneme "oi" or "oy", the spelling pattern of "boy" may be displayed while also displaying a picture depicting an object, such as for example, oil, the pronunciation of which includes the phoneme "oi". Accordingly, the learner may be reminded of the speech sound associated with the phoneme. Similarly, referring to FIG. 5, a picture 506 of planet earth may be displayed in the sound-letter card 500 in order to facilitate pronunciation of the spelling pattern 504 "er th" or "e$_a$r th".

Figure 3:
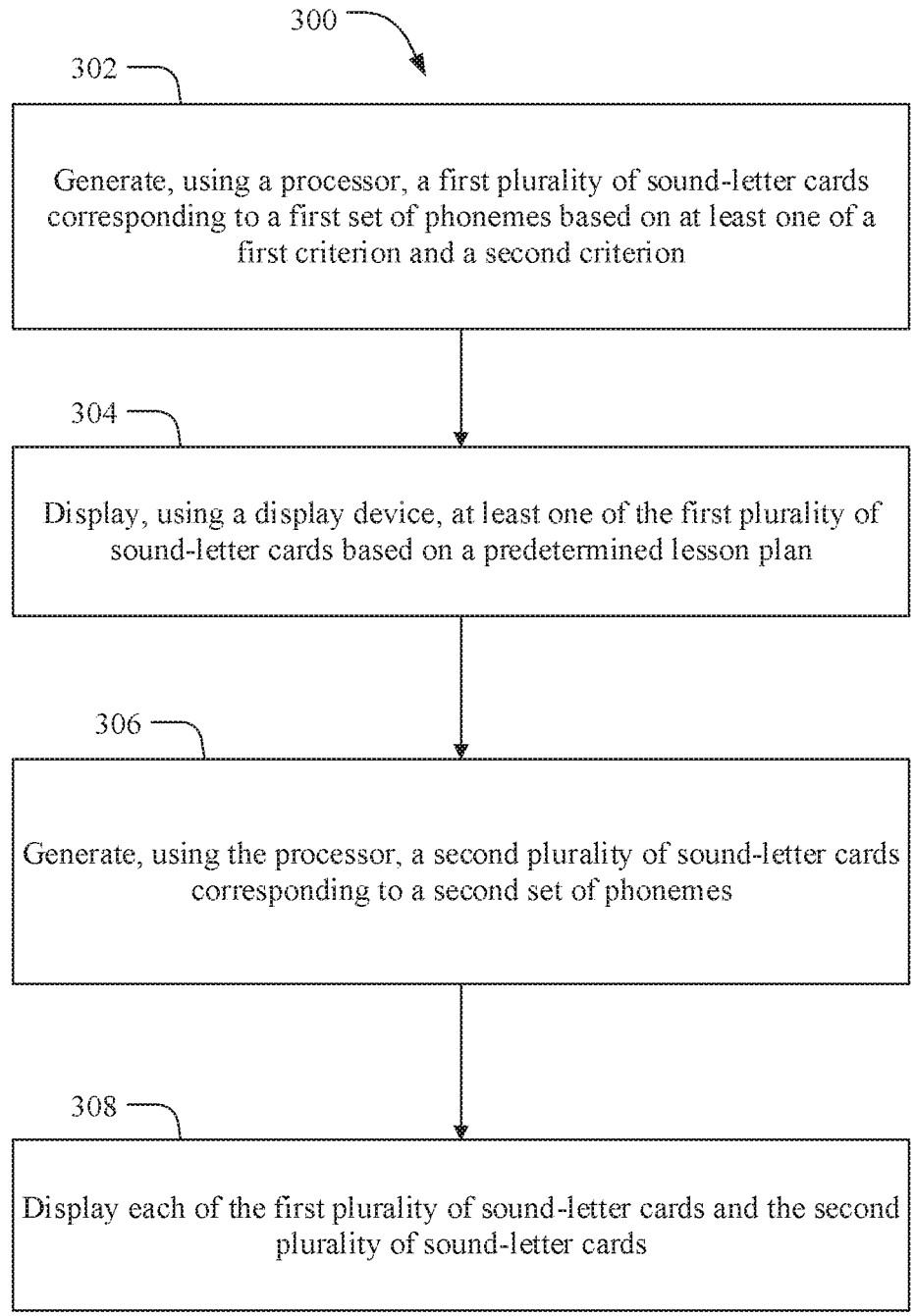
FIG. 3 illustrates a flowchart depicting a method 300 of facilitating learning of correspondence between speech sounds and spelling patterns, in accordance with some other embodiments.

FIG. 3 illustrates a flowchart of a method 300 performable by the learning system 100, in accordance with some other embodiments. The method 300 may include a step 302 of generating the first plurality of sound-letter cards. Further, the method 300 may include a step 304 of displaying the one or more sound-letter cards of the first plurality of sound-letter cards. Details regarding the step 302 and 304 may be understood from description of corresponding steps 202 and 204 provided in relation to FIG. 2.

Further, the method 300 may include a step 306 of generating, using the processor 102, a second plurality of sound-letter cards corresponding to a second set of phonemes. The second set of the phonemes may include, for example, one or more of digraphs, trigraphs, and r-controlled vowels. Further, each sound-letter card of the second plurality of sound-letter cards may include each of a speech sound and a spelling pattern. A digraph denotes a phoneme represented by two letters. Similarly, a trigraph denotes a phoneme represented by three letters. Likewise, an r-controlled vowel denotes a phoneme represented by a vowel followed by an "r". Additionally, the method 300 may include a step 308 of displaying each of the first plurality of sound-letter cards and the second plurality of sound-letter cards. In an instance, the second plurality of sound-letter cards may be displayed to a learner subsequent to the learner having learnt the correspondence between speech sounds and spelling patterns associated with the 25 phonemes corresponding to letters "a" through "z". Accordingly, the method 300 may facilitate learning through a gradual process.

Figure 4:
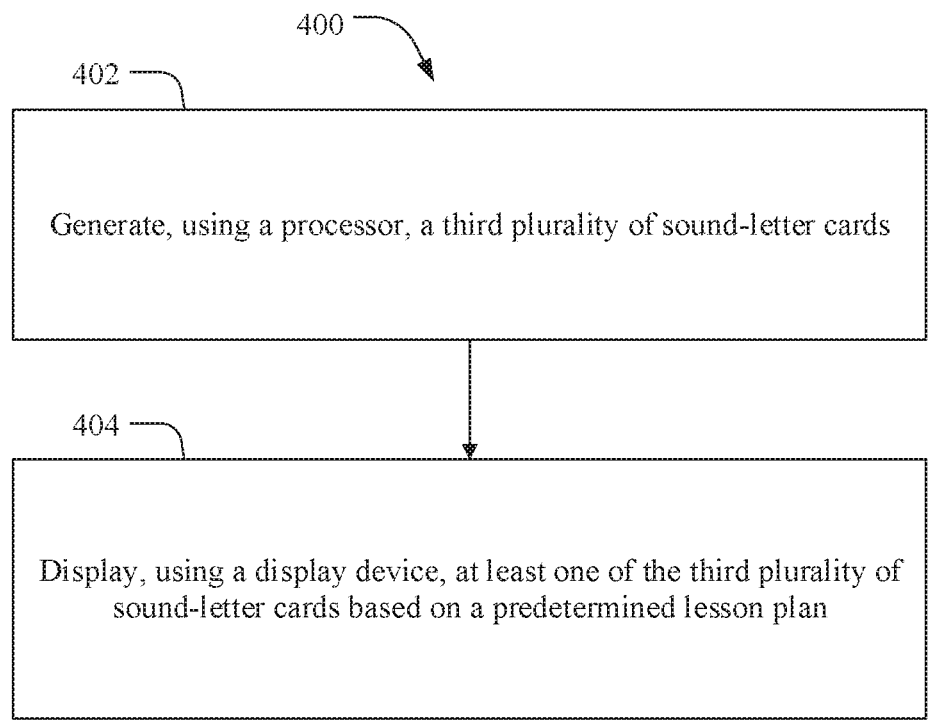
FIG. 4 illustrates a flowchart depicting a method 400 of facilitating learning of correspondence between speech sounds and spelling patterns, in accordance with yet some embodiments.

Further, FIG. 4 illustrates a flowchart of a method 400 performable by the learning system 100, in accordance with some embodiments. The method 400 may include a step 402 of generating, using the processor, a third plurality of sound-letter cards. Each sound-letter card of the third plurality of sound-letter cards may include a word and a spelling pattern. For instance, the word may include a short vowel. Further, the word may conform to a consonant-vowel-consonant (CVC) form. Furthermore, the spelling pattern may include a plurality of letters representing a blending of speech sounds associated with consonant-vowel (CV) part of the CVC form.

For example, the learning system 100 may be configured to partition a CVC word as CV/C rather than C/VC as done in traditional learning systems. While blending as per the C/VC form may appear logical, such as B/at, c/at, f/at, etc., according to the learning system 100, this is unnatural and inefficient for the following two reasons.

Firstly, the learner may not read a word like "bat" as "Bu . . . at". When learners are speaking, they do not say that "I need to play baseball with a Bu—at". Instead, it is much more efficient and easier to teach learners the sound "Ba" and they will comprehend the word in context. For instance, if someone said 'I need a "Ba"' while playing baseball, the listener would assume that a bat was referred to. In another example, if someone said 'My wallet is in my "Ba"' the listener will naturally assume the word was "bag".

The traditional learning system may try to make learn learners blend all the way to the final consonant but the learning system 100 does not. The reason is because if the learner simply learns the "Ba" sound and how to pronounce it, it will eliminate the need to blend all the way to the final consonant. The learner can audibly comprehend every instance of the "Ba" words without having to blend all the way to the final consonant. Therefore, knowing the CV blending of "Ba" is much more streamlined and easier because it will cover every instance of any CVC combination such as, but not limited to, bag, bad, bam, ban, back, and bass.

Figure 6:
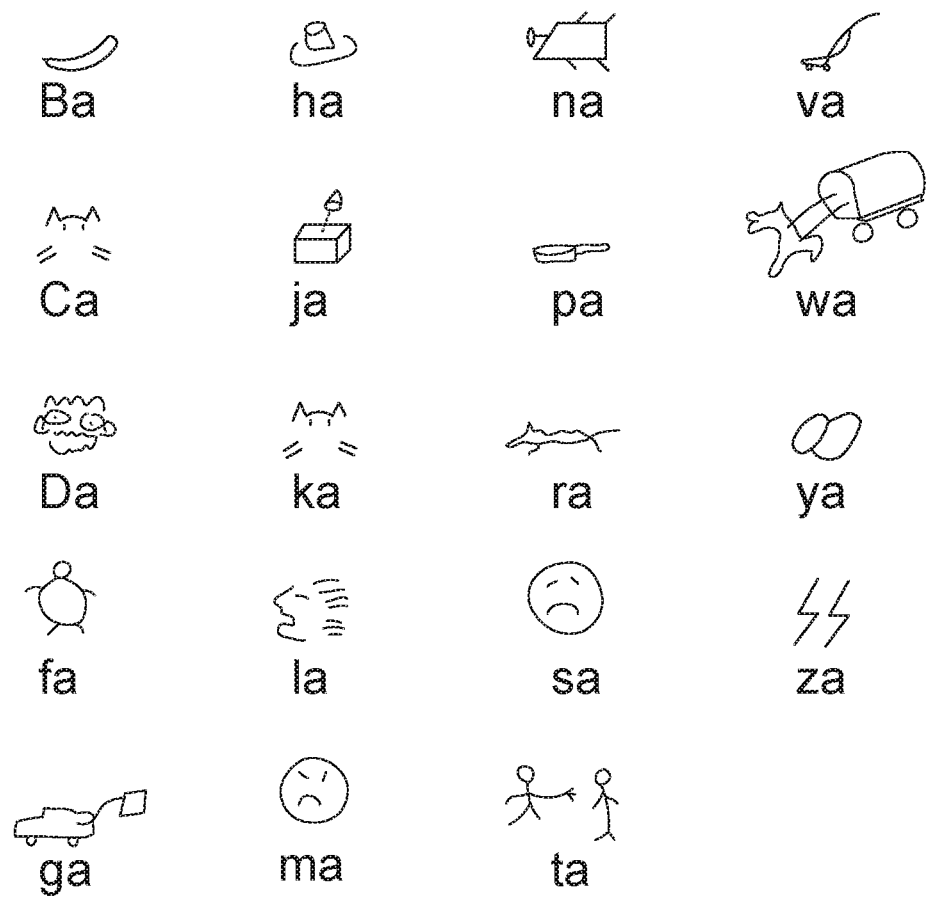
FIG. 6 is a photograph depicting a CV chart for short "a".

In an exemplary embodiment of the present disclosure, the learning system 100 may facilitate the learner to focus on blending the onset CV part with the consonant on the rime position. However, in some embodiments, the learning system 100 may provide this only after the learner has mastered the CV chart of all short "a" vowels, without taking aid of a picture and/or a sound. FIG. 6 illustrates a chart depicting an example of the CV combination with the rime consonant. Further, the learning system 100 may be configured to allow the teacher to select the entire list of consonants in the alphabet or select those corresponding to real word CVC blending.

Further, the third plurality of sound-letter cards may a first set of sound-letter cards, a second set of sound-letter cards and a third set of sound-letter cards. Further, each word in the first set of sound-letter cards may include a short "a". Similarly, each word in the second set of sound-letter cards may include a short "i". Likewise, each word in the third set of sound-letter cards may include at least one of a long vowel and an r-controlled vowel.

In an instance, once the learner has mastered the CV words with short "a" under a minute, the learner may be ready to read a book. Accordingly, in some embodiments, the learning system 100 may be configured to display the book to the learner on the display device 104. Reading the book may be initiated as soon as on the first day. The book may largely have all short /a/ CV's. Further, the words in the book may be 3-letter CVC words. As an example, if the word is "Sam" the learner may read it as "sa" instead of "Sam" or if the word is "sat" the learner may only read it as "sa". This is acceptable and intentional.

In some embodiments, the learning system 100 may be configured to facilitate mastering of the short "i" CV words before facilitating mastering of the short "a" and "i" CV combinations. As an example, the learning system 100 may generate words like "big", "sit" or "fix". Further, the learner may need to cover CV combinations "bi", "si" and "si" while scanning vertically before horizontally.

Further, the method 400 may include a step 404 of displaying, using the display device 104, the third plurality of sound-letter cards based on the predetermined lesson plan. In some embodiments, the third plurality of sound-letter cards comprising the first, second and third sets of sound-letter cards may be displayed according to the predetermined lesson plan. For example, the displaying at step 404 may include displaying the first set of sound-letter cards, the second set of sound-letter cards and the third set of sound-letter cards in a time order. The time order, may be specified by the predetermined lesson plan and/or provided by the teacher through the teacher interface. For instance, the time order may dictate that the displaying of the first set of sound-letter cards precedes displaying of each of the second set of sound-letter cards and the third set of sound-letter cards.

Further, in some embodiments, displaying of the third plurality of sound-letter cards may include alternately displaying words with different consonants but a common short vowel. For example, the learning system 100 may be configured for alternately displaying "Ba", "Da", "Ca", "Ga", etc. in order to teach the student the short "a".

Additionally, in some embodiments, the displaying of a plurality of sound-letter cards from a selected set of sound-letter cards is performed randomly. Accordingly, the selected set of sound letter cards may be one of the first set of sound-letter cards, the second set of sound-letter cards and the third set of sound-letter cards. For example, the learning system 100 may enable the teacher to select the first set of sound-letter cards and further provide an option to the teacher to enable randomly displaying sound-letter cards from the first set of sound-letter cards.

Further, in some embodiments, the learning system 100 may be configured to display a spelling template including a plurality of symbols selected from the group consisting of a space, a slash, a square and an arrow. Further in some embodiments, the learning system 100 may be further configured for displaying each of a correct phoneme and an incorrect phoneme in conjunction with the spelling template. Additionally, the spelling template may include one or more blank spaces. Accordingly, the learning system 100 may be further configured for receiving a phoneme selection input from a learner interface corresponding to one of the correct phoneme and the incorrect phoneme to complete the one or more blank spaces. In other words, the learner may interact with the learning interface to select one of the correct phoneme and the incorrect phoneme and fill the one or more blank spaces. Further, in some embodiments, the learning system 100 may be further configured for displaying a letter bank comprising a plurality of letters. Furthermore, the learning system 100 may be further configured for receiving a letter selection input from the learner interface corresponding to one of the plurality of letters to complete the one or more blank spaces.

According to the foregoing description, the disclosed method and system provide various advantages. For instance, the learning system 100 facilitates learning of correspondence between speech sounds and spelling patterns in a stage-wise process. Accordingly, in a first stage learners are exposed to the 25 phonemes corresponding to the letters "a" through "z" while subsequently in the second stage, learners are exposed to phonemes associated with digraphs, trigraphs and r-controlled vowels. As a result, learners experience improved learning. Additionally, by ensuring that spelling patterns containing the short "u" are used for facilitating learning speech sounds of a phoneme, learners are able to learn more naturally and easily. Furthermore, by ensuring that the spelling patterns contain the letters corresponding to a phoneme at an onset position, learners are able to speak sooner, while being comprehended reliably.

Although the invention has been explained in relation to its preferred embodiment, it is to be understood that many other possible modifications and variations can be made without departing from the spirit and scope of the invention as hereinafter claimed.

Figure 7:
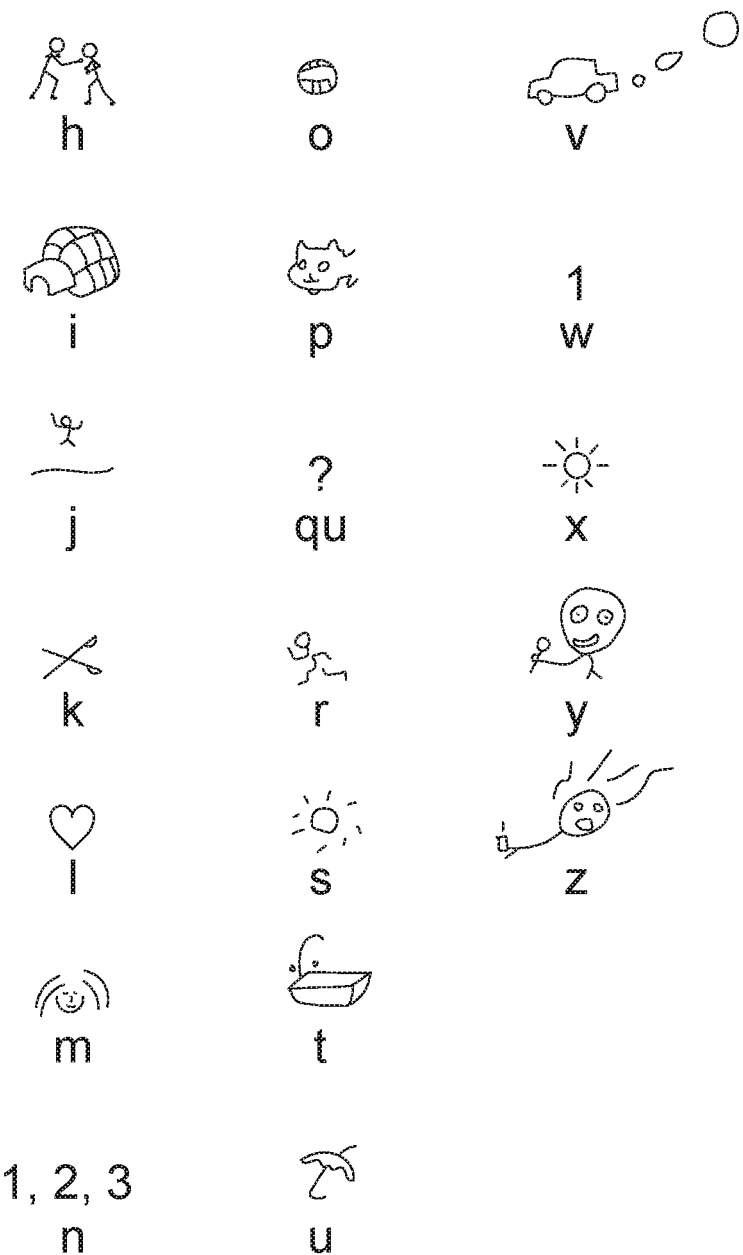
FIG. 7 is a photograph depicting sound spelling cards with the "schwa" sound.

FIG. 7 is a photograph depicting sound spelling cards with the "schwa" sound.

Figure 8:
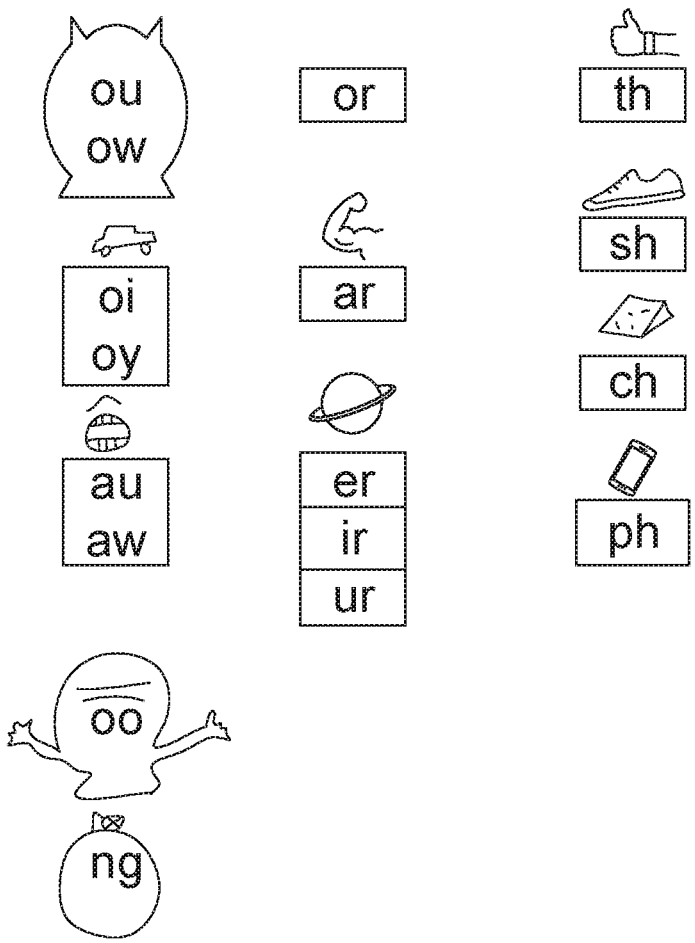
FIG. 8 is a photograph depicting a sample phoneme chart.

FIG. 8 is a photograph depicting a sample phoneme chart.

FIG. 9 is a photograph depicting a bivalence spelling test.

FIG. 10 is a photograph depicting a phonetic spelling method.

FIG. 11 is a photograph depicting a sentence template.

Figure 12:
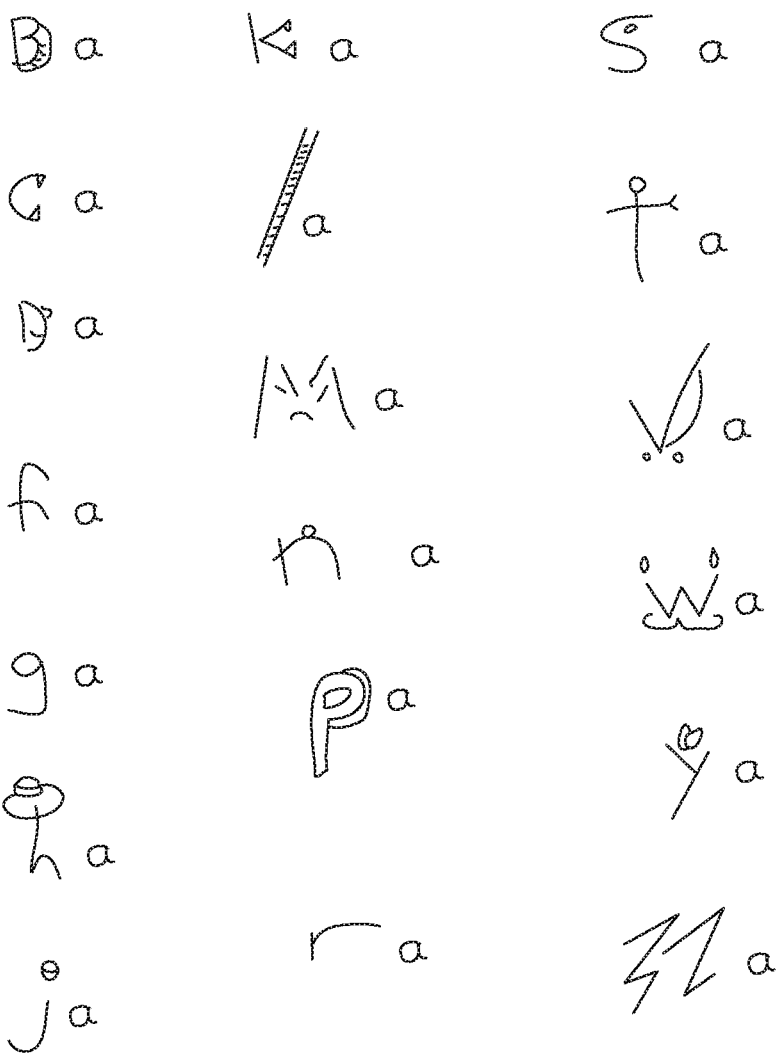
FIG. 12 is a photograph depicting anthropomorphic letters (letters that look like the sound).

FIG. 12 is a photograph depicting anthropomorphic letters (letters that look like the sound).

FIG. 13 is a photograph depicting a sample decodable book with pictures and syllable breaks.

FIG. 14 is a photograph depicting discrimination letters for short "a" vs. short "i".

Figure 15:
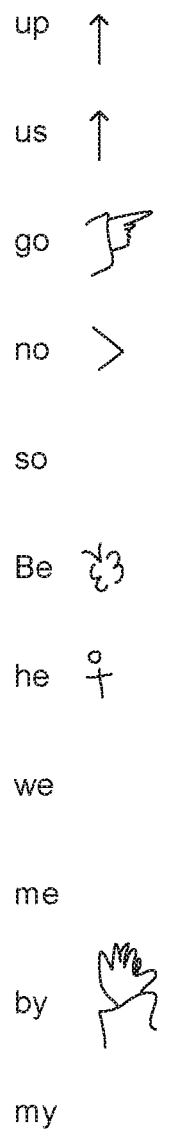

FIG. 15 is a photograph depicting a sample of a high frequency word chart.

FIG. 16 is a photograph depicting a consonant blend chart.

FIG. 17 is a photograph depicting a consonant-vowel to consonant blending chart.

Figure 18:
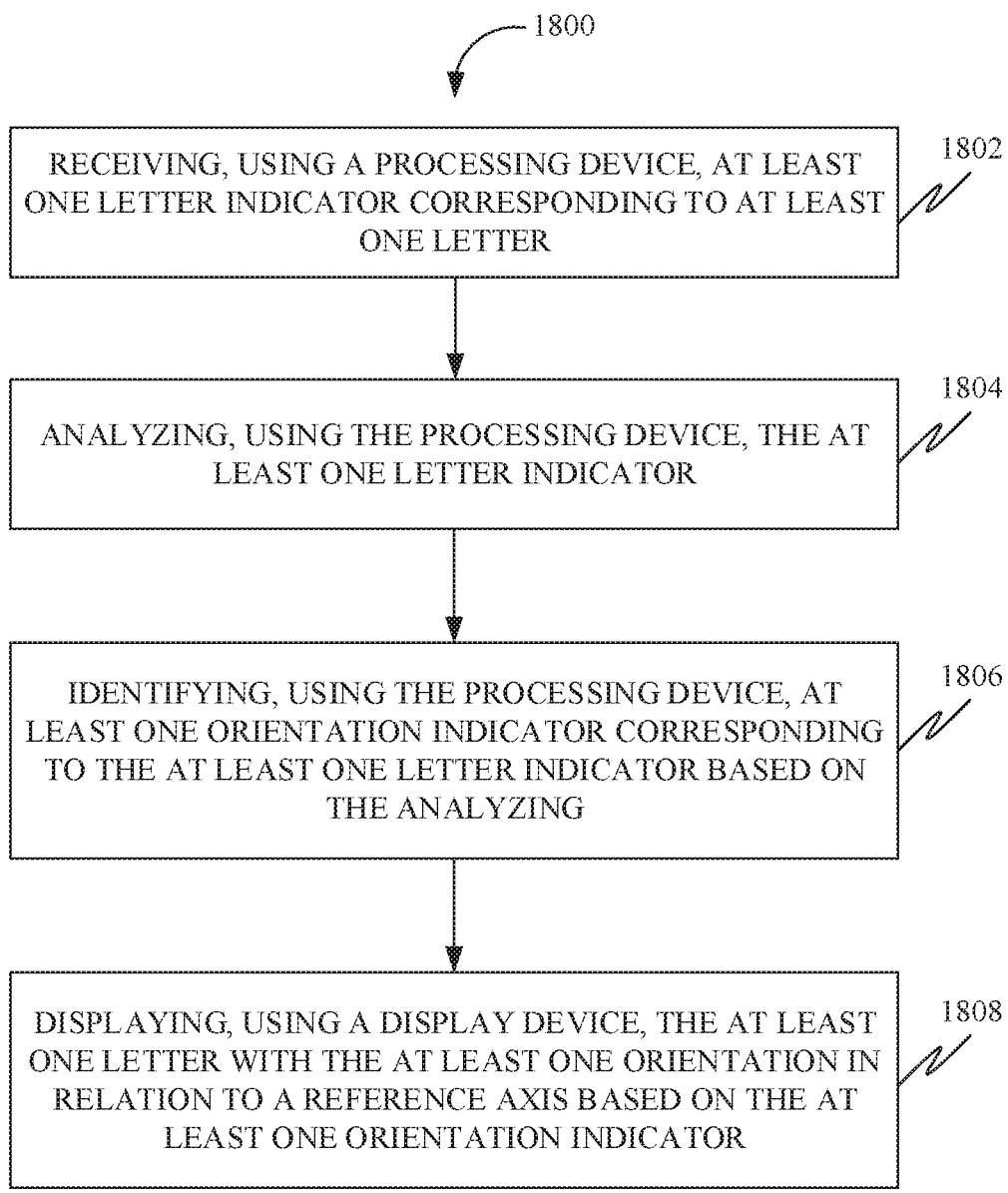
FIG. 18 shows a method of facilitating learning of correspondence between one or more letters and one or more speech characteristics, in accordance with some other embodiments.

FIG. 18 shows a method 1800 of facilitating learning of correspondence between one or more letters and one or more speech characteristics. At 1802, the method 1800 may include receiving, using a processing device, at least one letter indicator corresponding to at least one letter.

Further, at 1804, the method 1800 may include analyzing, using the processing device, the at least one letter indicator.

Further, at 1806, the method 1800 may include identifying, using the processing device, at least one orientation indicator corresponding to the at least one letter indicator based on the analyzing.

Further, at 1808, the method 1800 may include displaying, using a display device, the at least one letter with the at least one orientation in relation to a reference axis based on the at least one orientation indicator. Further, the displaying of the at least one letter may be representative of at least one speech characteristic associated with the at least one letter.

In some embodiments, the at least one letter indicator may include a cluster indicator representing a plurality of predetermined letters.

In some embodiments, the at least one orientation indicator may include a single orientation indicator corresponding to each of the plurality of predetermined letters.

In some embodiments, the at least one orientation indicator may include a plurality of orientation indicators corresponding to at least two predetermined letters of the plurality of predetermined letters.

In some embodiments, the at least one letter may be comprised in a word including a plurality of letters. Further, the displaying may include displaying the plurality of letters. Further, the at least one orientation may be in relation to at least one other letter comprised in the word.

In some embodiments, the analyzing may include querying, using a storage device communicatively coupled to the processing device, based on the at least one letter indicator. Further, the identifying of the at least one orientation indicator may be based on a result of the querying.

In some embodiments, the at least one speech characteristic may include at least one articulatory gesture indicator representing at least one movement of at least one speech articulator muscle. In some embodiments, the at least one articulatory gesture may include a state of one or more of a mouth and a tongue of an individual. For example, as shown in FIG. 20, the at least one letter may include "m" 2002 within a word such as "Sam". Accordingly, the at least one orientation indicator may include 90 degrees. As a result, displaying of the letter "m" 2002 at 90 degrees (horizontal "m" 2004) in relation to the letters "Sa" of the word "Sam" 2006 may result in a visual representation of a closed mouth. Accordingly, the at least one articulatory gesture indicator may represent the closed mouth.

Figure 21:
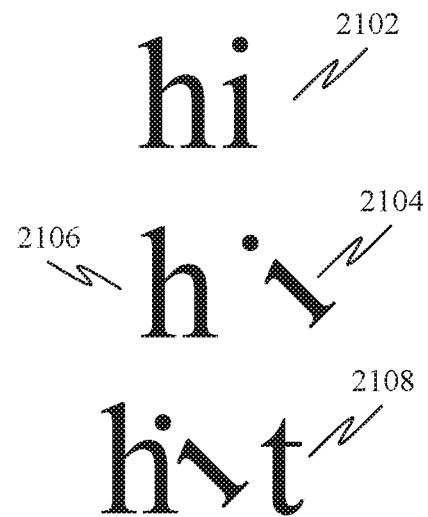
FIG. 21 shows a speech characteristic including a state of motion of a letter in relation to a reference axis.

In some embodiments, the at least one speech characteristic may include a state of motion of the at least one letter in relation to the reference axis. Further, a predetermined word may be associated with the state of motion. Further, the speech characteristic may include a predetermined speech sound associated with the predetermined word. Further, the predetermined speech sound may be a vocalization clue for vocalizing the at least one letter. For example, as shown in FIG. 21 the at least one letter may include a cluster of letters "hi" 2102. Further, the at least one orientation may include an angle of 45 degrees associated with the letter "i" 2104 in relation to the reference axis (i.e. a vertical line and/or a normal orientation of the letter "h" 2106). Accordingly, displaying of the letter "i" 2104 at the angle of 45 degrees in relation to the displaying of the letter "h" 2106 may indicate a state of motion of the letter "i" 2104 falling and hitting the letter "h" 2106. Accordingly, the predetermined word may include "hit" 2108 wherein the predetermined speech sound associated with vocalizing the word "hit" 2108 (i.e. the way in which "hi" 2102 is pronounced in the word "hit" 2108) may constitute the vocalization clue for vocalizing the cluster "hi" 2102.

Figure 22:
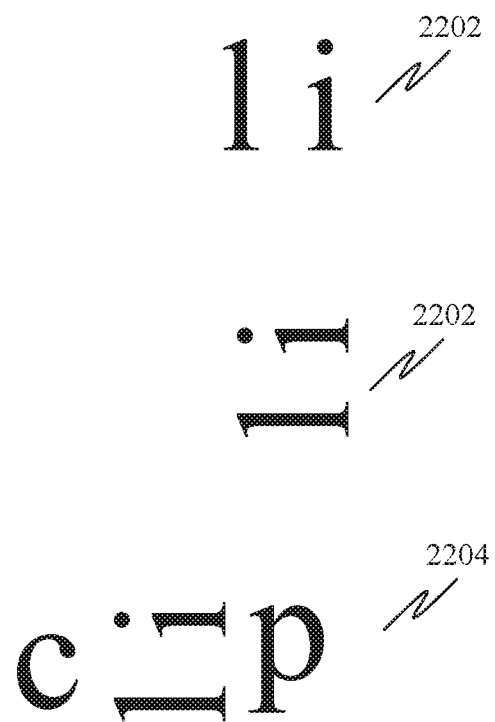
FIG. 22 shows a vocalization clue for vocalizing a letter.

In some embodiments, the at least one speech characteristic may include a graphical representation of a predetermined object. Further, a predetermined word may be associated with the at least a part of the predetermined object. Further, the speech characteristic may include a predetermined speech sound associated with the predetermined word. Further, the predetermined speech sound may be a vocalization clue for vocalizing the at least one letter. For example, as shown in FIG. 22, the at least one letter may include a cluster of letters "li" 2202. Further, the at least one orientation may include 90 degrees. Accordingly, displaying of the cluster of letters "li" with 90 degrees orientation 2202 may result in a graphical representation of a face (i.e. a winking face). Accordingly, the predetermined object may be a face of a person, while the part may be the lips. Accordingly, the vocalization clue for the speech sound associated with the cluster "li" 2202 may be the sounding of the syllable corresponding to "li" 2202 in the word "clip" 2204.

Figure 19:
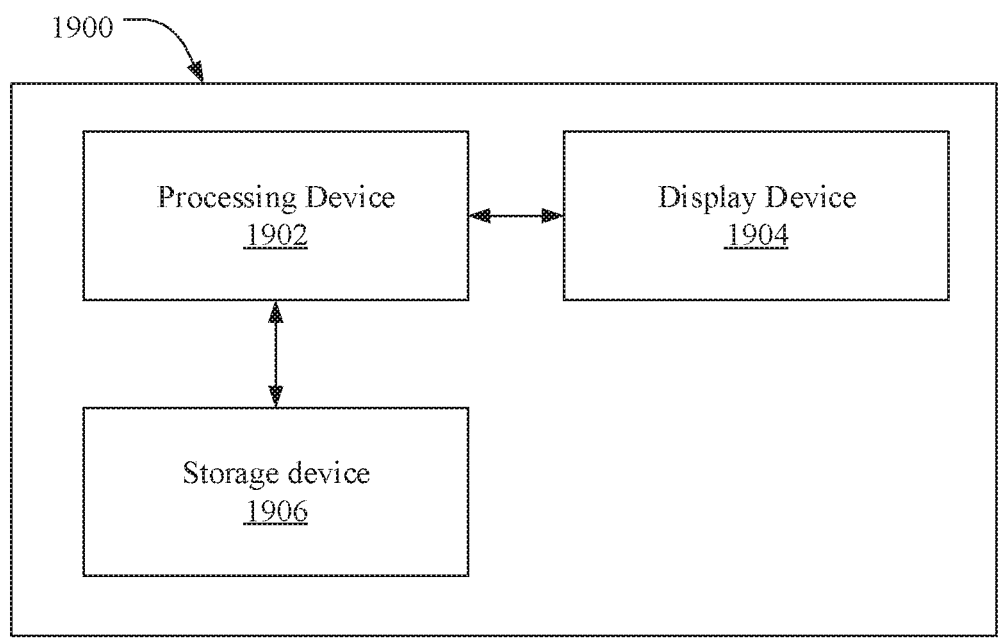
FIG. 19 shows a system of facilitating learning of correspondence between one or more letters and one or more speech characteristics, in accordance with some other embodiments.

FIG. 19 shows a system 1900 of facilitating learning of correspondence between one or more letters and one or more speech characteristics. Further, the system 1900 may include a processing device 1902 configured for receiving at least one letter indicator corresponding to at least one letter. Further, the processing device 1902 may be configured for analyzing the at least one letter indicator. Further, the processing device 1902 may be configured for identifying at least one orientation indicator corresponding to the at least one letter indicator based on the analyzing. Further, the at least one orientation indicator may represent at least one orientation with which the at least one letter may be displayed. Further, the system 1900 may include a display device 1904 configured for displaying the at least one letter with the at least one orientation in relation to a reference axis based on the at least one orientation indicator. Further, the displaying of the at least one letter may be representative of at least one speech characteristic associated with the at least one letter.

In some embodiments, the at least one letter indicator may include a cluster indicator representing a plurality of predetermined letters.

Further, in some embodiments, the at least one orientation indicator may include a single orientation indicator corresponding to each of the plurality of predetermined letters.

In some embodiments, the at least one orientation indicator may include a plurality of orientation indicators corresponding to at least two predetermined letters of the plurality of predetermined letters.

In some embodiments, the at least one letter may be comprised in a word including a plurality of letters. Further, the displaying may include displaying the plurality of letters. Further, the at least one orientation may be in relation to at least one other letter comprised in the word.

Further, in some embodiments, the system 1900 may include a storage device 1900 communicatively coupled with the processing device 1902. Further, the analyzing may include querying based on the at least one letter indicator.

Further, the identifying of the at least one orientation indicator may be based on a result of the querying.

In some embodiments, the at least one speech characteristic may include at least one articulatory gesture indicator representing at least one movement of at least one speech articulator muscle.

In some embodiments, the at least one articulatory gesture may include a state of one or more of a mouth and a tongue of an individual.

In some embodiments, the at least one speech characteristic may include a state of motion of the at least one letter in relation to the reference axis. Further, a predetermined word may be associated with the state of motion. Further, the speech characteristic may include a predetermined speech sound associated with the predetermined word. Further, the predetermined speech sound may be a vocalization clue for vocalizing the at least one letter.

In some embodiments, the at least one speech characteristic may include a graphical representation of a predetermined object. Further, a predetermined word may be associated with the at least a part of the predetermined object. Further, the speech characteristic may include a predetermined speech sound associated with the predetermined word. Further, the predetermined speech sound may be a vocalization clue for vocalizing the at least one letter.

Figure 23:
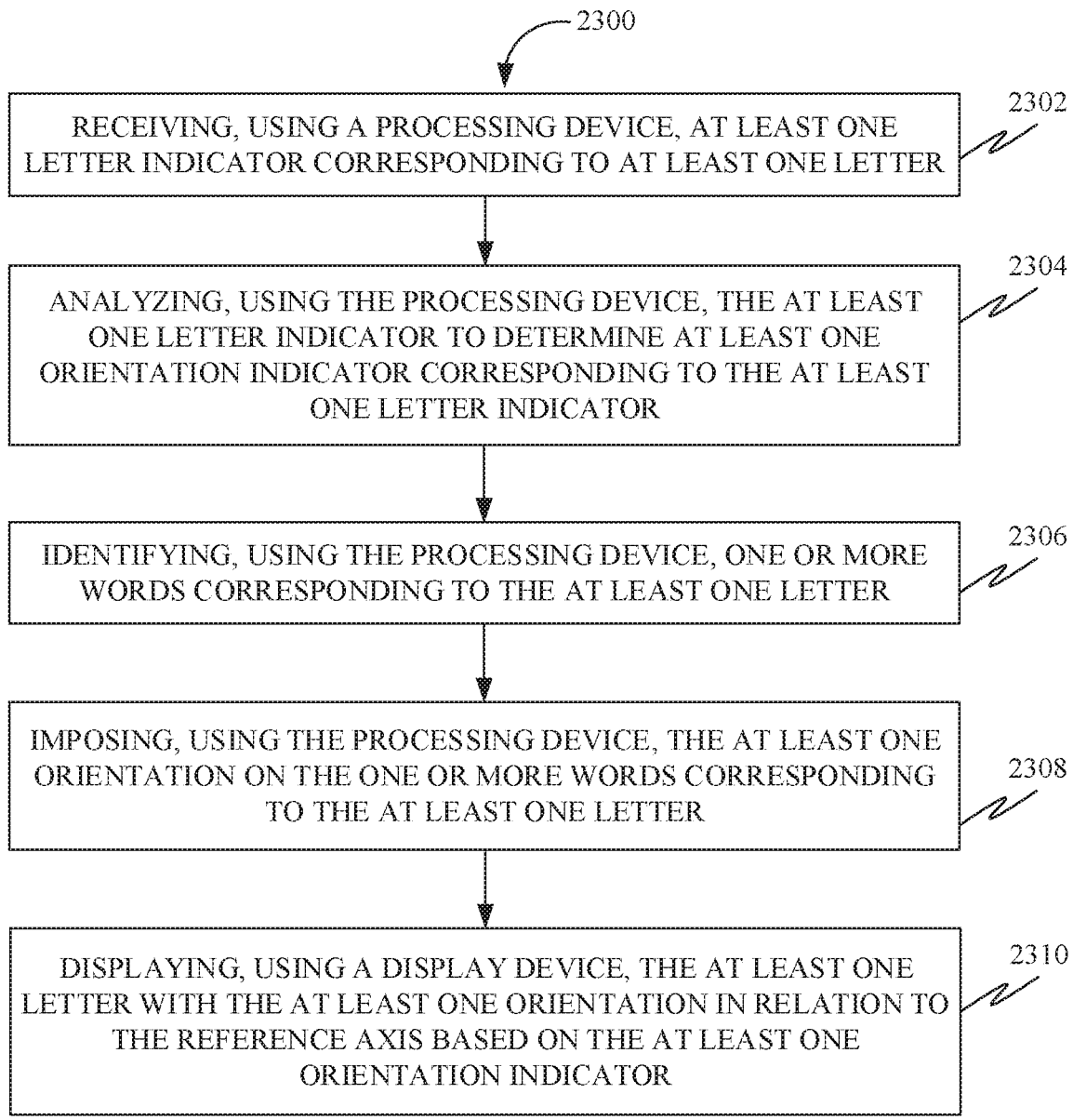
FIG. 23 shows a method of facilitating discovery of orientations for one or more letters to enable learning of correspondence between the one or more letters and one or more speech characteristics of the one or more letters, in accordance with some other embodiments.

FIG. 23 shows a method 2300 of facilitating discovery of orientations for one or more letters to enable learning of correspondence between the one or more letters and one or more speech characteristics of the one or more letters. At 2302, the method 2300 may include receiving, using a processing device, at least one letter indicator corresponding to at least one letter. In some embodiments, the at least one letter indicator may include a cluster indicator representing a plurality of predetermined letters. Further, in some embodiments, the at least one letter indicator may include at least one speech characteristic associated with the at least one letter.

Further, at 2304, the method 2300 may include analyzing, using the processing device, the at least one letter indicator to determine at least one orientation indicator corresponding to the at least one letter indicator. Further, the analyzing may include imposing at least one orientation corresponding to at least one orientation indicator on the at least one letter. Further, the analyzing may include comparing the at least one orientation corresponding to at least one orientation indicator with one or more images of one or more objects to determine a likeness of the at least one orientation with at least one object of the one or more objects. In some embodiments, the analyzing may include querying, using a storage device communicatively coupled to the processing device, at least one image database including the one or more images of the one or more objects based on the at least one letter indicator, and the at least one orientation. In some embodiments, the at least one orientation may include a state of motion of the at least one letter in relation to a reference axis. Further, the at least one letter may be associated with the state of motion. Further, the at least one orientation may correspond to the speech characteristic corresponding to a speech sound associated with the at least one letter indicator corresponding to the at least one letter. Further, the predetermined speech sound may be a vocalization clue for vocalizing the at least one letter. In some embodiments, the at least one orientation may include a graphical representation of the at least one object.

Further, at 2306, the method 2300 may include identifying, using the processing device, one or more words corresponding to the at least one letter. In some embodiments, the identifying may include querying, using a storage device communicatively coupled to the processing device, at least one image database including one or more words and one or more speech characteristics of the one or more words based on the at least one letter indicator. Further, the one or more identified words may include the at least one letter corresponding to the at least one letter indicator. Further, the one or more words corresponding to the at least one letter may be associated with the at least a part of the at least one object included in the at least one orientation. Further, the speech characteristic may include the speech sound associated with the at least one letter. Further, the predetermined speech sound may be a vocalization clue for vocalizing the at least one letter, and the one or more words corresponding to the at least one letter Further, the at least one orientation indicator may represent at least one orientation with which the at least one letter may be displayed. In some embodiments, the at least one orientation indicator may include a single orientation indicator corresponding to each of the plurality of predetermined letters. In some embodiments, the at least one orientation indicator may include a plurality of orientation indicators corresponding to at least two predetermined letters of the plurality of predetermined letters. In some embodiments, the at least one letter may be comprised in a word including a plurality of letters.

Further, at 2308, the method 2300 may include imposing, using the processing device, the at least one orientation on the one or more words corresponding to the at least one letter.

Further, at 2310, the method 2300 may include displaying, using a display device, the at least one letter with the at least one orientation in relation to the reference axis based on the at least one orientation indicator. Further, the displaying of the at least one letter may be representative of at least one speech characteristic associated with the at least one letter.

What is claimed is:

1. A method of facilitating learning of correspondence between one or more letters and one or more speech characteristics, the method comprising:
   receiving, using a processing device, at least one letter indicator corresponding to at least one letter;
   analyzing, using the processing device, the at least one letter indicator;
   identifying, using the processing device, at least one orientation indicator corresponding to the at least one letter indicator based on the analyzing, wherein the at least one orientation indicator represents at least one orientation with which the at least one letter is to be displayed; and
   displaying, using a display device, the at least one letter with the at least one orientation in relation to a reference axis based on the at least one orientation indicator, wherein the displaying of the at least one letter is representative of at least one speech characteristic associated with the at least one letter;
   wherein the analyzing comprises querying, using a storage device communicatively coupled to the processing device, based on the at least one letter indicator, wherein the identifying of the at least one orientation indicator is based on a result of the querying.

2. The method of claim 1, wherein the at least one letter indicator comprises a cluster indicator representing a plurality of predetermined letters.

3. The method of claim 2, wherein the at least one orientation indicator comprises a single orientation indicator corresponding to each of the plurality of predetermined letters.

4. The method of claim 2, wherein the at least one orientation indicator comprises a plurality of orientation indicators corresponding to at least two predetermined letters of the plurality of predetermined letters.

5. The method of claim 1, wherein the at least one letter is comprised in a word comprising a plurality of letters, wherein the displaying comprises displaying the plurality of letters, wherein the at least one orientation is in relation to at least one other letter comprised in the word.

6. The method of claim 1, wherein the at least one speech characteristic comprises at least one articulatory gesture indicator representing at least one movement of at least one speech articulator muscle.

7. The method of claim 6, wherein the at least one articulatory gesture comprises a state of at least one of a mouth and a tongue of an individual.

8. The method of claim 1, wherein the at least one speech characteristic comprises a state of motion of the at least one letter in relation to the reference axis, wherein a predetermined word is associated with the state of motion, wherein the speech characteristic further comprises a predetermined speech sound associated with the predetermined word, wherein the predetermined speech sound is a vocalization clue for vocalizing the at least one letter.

9. The method of claim 1, wherein the at least one speech characteristic comprises a graphical representation of a predetermined object, wherein a predetermined word is associated with the at least a part of the predetermined object, wherein the speech characteristic further comprises a predetermined speech sound associated with the predetermined word, wherein the predetermined speech sound is a vocalization clue for vocalizing the at least one letter.

10. A system for facilitating learning of correspondence between one or more letters and one or more speech characteristics, the system comprising:
    a processing device configured for:
      receiving at least one letter indicator corresponding to at least one letter;
      analyzing the at least one letter indicator;
      identifying at least one orientation indicator corresponding to the at least one letter indicator based on the analyzing, wherein the at least one orientation indicator represents at least one orientation with which the at least one letter is to be displayed; and
    a display device configured for displaying the at least one letter with the at least one orientation in relation to a reference axis based on the at least one orientation indicator, wherein the displaying of the at least one letter is representative of at least one speech characteristic associated with the at least one letter;
    wherein the system further comprises a storage device communicatively coupled with the processing device, wherein the analyzing comprises querying based on the at least one letter indicator, wherein the identifying of the at least one orientation indicator is based on a result of the querying.

11. The system of claim 10, wherein the at least one letter indicator comprises a cluster indicator representing a plurality of predetermined letters.

12. The system of claim 11, wherein the at least one orientation indicator comprises a single orientation indicator corresponding to each of the plurality of predetermined letters.

13. The system of claim 11, wherein the at least one orientation indicator comprises a plurality of orientation indicators corresponding to at least two predetermined letters of the plurality of predetermined letters.

14. The system of claim 10, wherein the at least one letter is comprised in a word comprising a plurality of letters, wherein the displaying comprises displaying the plurality of letters, wherein the at least one orientation is in relation to at least one other letter comprised in the word.

15. The system of claim 10, wherein the at least one speech characteristic comprises at least one articulatory gesture indicator representing at least one movement of at least one speech articulator muscle.

16. The system of claim 15, wherein the at least one articulatory gesture comprises a state of at least one of a mouth and a tongue of an individual.

17. The system of claim 10, wherein the at least one speech characteristic comprises a state of motion of the at least one letter in relation to the reference axis, wherein a predetermined word is associated with the state of motion, wherein the speech characteristic further comprises a predetermined speech sound associated with the predetermined word, wherein the predetermined speech sound is a vocalization clue for vocalizing the at least one letter.

18. The system of claim 10, wherein the at least one speech characteristic comprises a graphical representation of a predetermined object, wherein a predetermined word is associated with the at least a part of the predetermined object, wherein the speech characteristic further comprises a predetermined speech sound associated with the predetermined word, wherein the predetermined speech sound is a vocalization clue for vocalizing the at least one letter.

* * * * *